United States Patent [19]

Gunsallus

[11] Patent Number: 5,163,011
[45] Date of Patent: Nov. 10, 1992

[54] REAL TIME LOAD MONITORING SYSTEM WITH REMOTE SENSING

[75] Inventor: Clifford Gunsallus, N. Canton, Conn.

[73] Assignee: Kaman Aerospace Corporation, Bloomfield, Conn.

[21] Appl. No.: 588,693

[22] Filed: Sep. 27, 1990

[51] Int. Cl.⁵ .......................................... G01M 7/00
[52] U.S. Cl. ...................................... 364/508; 73/577; 340/603
[58] Field of Search ........................ 364/507, 508, 506; 73/118, 574, 579, 583, 455, 1 R, 577, 660; 340/665, 671, 672, 603, 615

[56] References Cited

U.S. PATENT DOCUMENTS

| | | | |
|---|---|---|---|
| 3,758,758 | 9/1973 | Games et al. | 364/508 |
| 4,426,641 | 1/1984 | Kurihara et al. | 364/508 X |
| 4,894,787 | 1/1990 | Flannelly et al. | 364/508 |
| 4,953,098 | 8/1990 | Fischer, Jr. et al. | 364/508 |

OTHER PUBLICATIONS

Bently Nevada Applications Note, "The Keyphasor—A Necessity for Machinery Diagnosis!" Nov. 1977.

*Primary Examiner*—Parshotam S. Lall
*Assistant Examiner*—Ellis R. Ramirez
*Attorney, Agent, or Firm*—McCormick, Paulding & Huber

[57] ABSTRACT

A system for determining the magnitude of loads on rotating helicopter components from sensor signals remotely measured on the helicopter fuselage is characterized by a controller which samples the sensor signals according to phase. These measured signals are presented to a coefficient programming module where they are combined with correlation signals to correlate the measured signal components with the desired parameter, such as flatwise bending moments of a helicopter blade. The correlation signals are established in a calibration process that determines the independent values of the measured signals using a Jones orthoganization process. The signals output from the module are recombined to provide a time dependent signal corresponding to the desired parameter. The present system avoids decomposition and recomposition of the measured signals and therefor operates in real time.

21 Claims, 4 Drawing Sheets

REAL TIME LOAD MONITORING SYSTEM WITH REMOTE SENSING

TECHNICAL FIELD

This invention relates to load monitoring devices and more particularly to load monitoring systems having remote sensing characterized by real time operation.

BACKGROUND OF THE INVENTION

Systems for monitoring force loads are well known and are used with a variety of products to determine structural conditions in mechanical components. These systems are characterized by a plurality of parameter sensors, such as strain gauges, which are positioned locally with the mechanical elements and provide signals to a remote processor. The measured data is correlated by the processor in accordance with a pre-established relationship. The processor output signals are indicative of the stress or loading conditions of the elements.

In many applications, the direct instrumentation of mechanical elements is possible. For example, strain gauges and sensors can easily be positioned locally on an airplane's wings and aerilons, with signals from the sensors conventionally routed to a remote cockpit processor. However, for some elements, such a rotating turbine blades in a jet engine, direct instrumentation is impossible or impractical. Another such example is a rotating helicopter blade. Direct instrumentation of the blade with locally positioned sensors can only be accomplished by employing a sophisticated slip ring apparatus which is prone to wear and must therefore be maintained on a frequency basis. As a result, remote blade mounted instrumentation is configured with a helicopter only for purposes of initial testing and calibration.

U.S. Pat. No. 4,485,678 to Fanuele discloses a Rotor Diagnostic and Balancing System which includes vibration and rotational sensors coupled to a processor providing outputs thereto. The processor is capable of generating a diagnostic output signal listing the origin of the vibration based upon preestablished standards and, if possible, effect a trim balance of the rotor. Those skilled in the art will note that the '678 system uses a maximum amplitude of the entire sensor signal and simple frequency domain analysis of the sensor system signals.

U.S. Pat. No. 4,764,882 to Braschel et al. discloses a method of monitoring fatigue of structural component parts of, for example, a nuclear power plant. The method is characterized by a plurality of sensors locally positioned on part (e.g. a feed water nozzle). On the basis of a local temperature distribution and/or the temperature versus time curve, the method will calculate respective temperature curves in the interior portion of the nozzle. A number of simplifications are necessary before a computed stress verses temperature curve can be generated. The '882 method uses direct sensing to a determine parameter magnitudes.

U.S. Pat. No. 4,345,472 to Hara et al. discloses a method and apparatus for digitally analyzing dynamic unbalance of a rotating body. A mechanical vibration of a rotating test body is fitted with a plurality of locally positioned sensors. The mechanical vibration is translated into a periodic signal which represents a combined vector of the unbalanced rotating body and the mechanism that rotates it. The '472 method divides the signal into two orthogonal vector components. Unknown values of four constants are determined by preliminary test having three successive stages involving rotating the test body a selected amount from a first stages position, sampling digital data signals and displacing the test body a predetermined amount with respect to that position. A trial dead weight of a known mass is mounted on the test body and it is rotated. In the third stage, a computer operates on the data and determines the four constants in accordance with a set of equations. Again, the '472 device directly senses a data signal and uses the entire data signal.

U.S. Pat. No. 4,758,964 discloses a method and apparatus for monitoring machine parts which is characterized by sensors that directly measure on the part the natural characteristic vibrational behavior thereof in operation and compares that measured vibrational signal to signals indicative of that part under normal operation. Should the signal differ substantially from the signal indicative of normal operation, an alarm is sounded. Note that the '964 apparatus uses direct sensing and uses the entire signal.

Techniques for indirectly measuring structural parameters of loaded mechanical elements have also been explored. With these techniques, sensors are remotely positioned from the loaded components of interest. For example, in an airplane, a plurality of sensors can be positioned on the aircraft body. The signal received at these sensors comprises a component due to the loading of the airplane body, as well as a component indicative of the loads on the aircraft wings. Using pre-determined relationships, a processor could ideally isolate the strain information from the element of interest and correlate that data to the loading of the element.

Ascertaining the signal component output loads on helicopter elements is inherently more difficult than for an airplane as the loads imposed upon the various rotating elements are periodic. Systems which have attempted to remotely determine structural parameters in the rotating elements of a helicopter, such as blade strains or moments, have been unsuccessful because the mathematical computations required have been deemed too complex and that the requisite data insufficiently measurable.

An example of a known system with remote sensing is disclosed and claimed in the commonly owned U.S. Pat. No. 4,894,787 and incorporated herein by reference. The '787 system is characterized by an apparatus mounted on the fixed system which receives signals from a rotating system. These signals are provided to a plurality of Fourier coefficient detectors to ascertain the respective Fourier coefficients therefor. Signals corresponding to these coefficients are combined with correlation coefficient signals previously determined. Sine and cosine generators provide signals to component synthesizers which also receive the combined coefficient output signals. The output therefrom is summed into a time dependent signal corresponding to the parameter of interest, such as helicopter blade bending moment.

The '787 system is burdened by the need to both decompose the sensed signal into its Fourier components and regenerate a time dependent signal using a multide of function generators. These requirements prevent the '787 system from being used in real time at high frequency and add undesirable complexity and cost. It would be advantageous to have a system for remote monitoring of parameters which would operate entirely in real time with a minimum of components. The present invention is directed towards such a system.

SUMMARY OF THE INVENTION

An object of the present invention is to provide a system that determines the magnitude of an element parameter from signals sensed remote from that element entirely in real time.

According to the present invention, a method of generating, from a first set of periodic signals measured in a first member indicative of a first member parameter, a relational set of signals equating with the first signal set a second set of periodic signals indicative of the parameter as measured in a cooperative second member includes the steps of measuring at preselected phases during each of a plurality of the signal periods a first signal set indicative of a first member parameter by means of sensors directly configured with the first member; measuring at the preselected phases during each of the plurality of signal periods a second signal set by means of sensors directly configured with the second member, the second member measured signal set, including signals indicative of the parameter and configuring a plurality of first member signal subsets from the first member signals set such that each thereof contain the signals at respective ones of the signal phases and configuring a plurality of second member signal subsets from the second member signal set such that each thereof contain the signals at respective ones of the signal phases. The first and second member signal subsets correspond to respective first and second mathematical vectors lying in a vector space, with each of the first and second member signal subsets sets mathematically configured into respective first and second matrices. Also included are the steps of computing, from the second signal member subsets substantially independent signal subsets thereof having a plurality of signal elements that substantially span the mathematical vector space and generating a spanning relational signal set corresponding to a mathematical pseudo inverse of the first member signal set with the substantially independent signal subset.

According to another aspect of the present invention, a system for determining a time dependent signal corresponding to a parameter in a first member includes a mechanism for measuring, in a second member cooperative with the first member, a time dependent periodic signal set at preselected phases thereof during each of a plurality of signal periods, the second member measured signal set including signal indicative of the first member parameter and a controller. The controller has a mechanism for configuring a plurality of second member signal subsets from the second member signal set such that each thereof contain the measured signals at respective ones of the signal phases; a mechanism for generating a signal set indicative of the first member parameter that combines the second member signal subsets with predetermined correlation coefficients generated by computing a mathematical pseudo inverse of a signal set corresponding to coefficients of first member parameter signals directly measured in the first member with a signal set corresponding to a substantially independent subset of signals indicative of the first member parameter directly measured in the second member, the first and second member coefficient signal sets corresponding to respective first and second mathematical vector lying in a vector space with each of the signal sets mathematically configured into respective first and second matrices comprised of elements corresponding to signals thereof arranged in rows and columns; and a mechanism for generating from the measured periodic signal and the computed first member parameter signal set a time dependent signal indicative of said first member parameter.

DESCRIPTION OF THE PREFERRED EMBODIMENT

Figure 1:
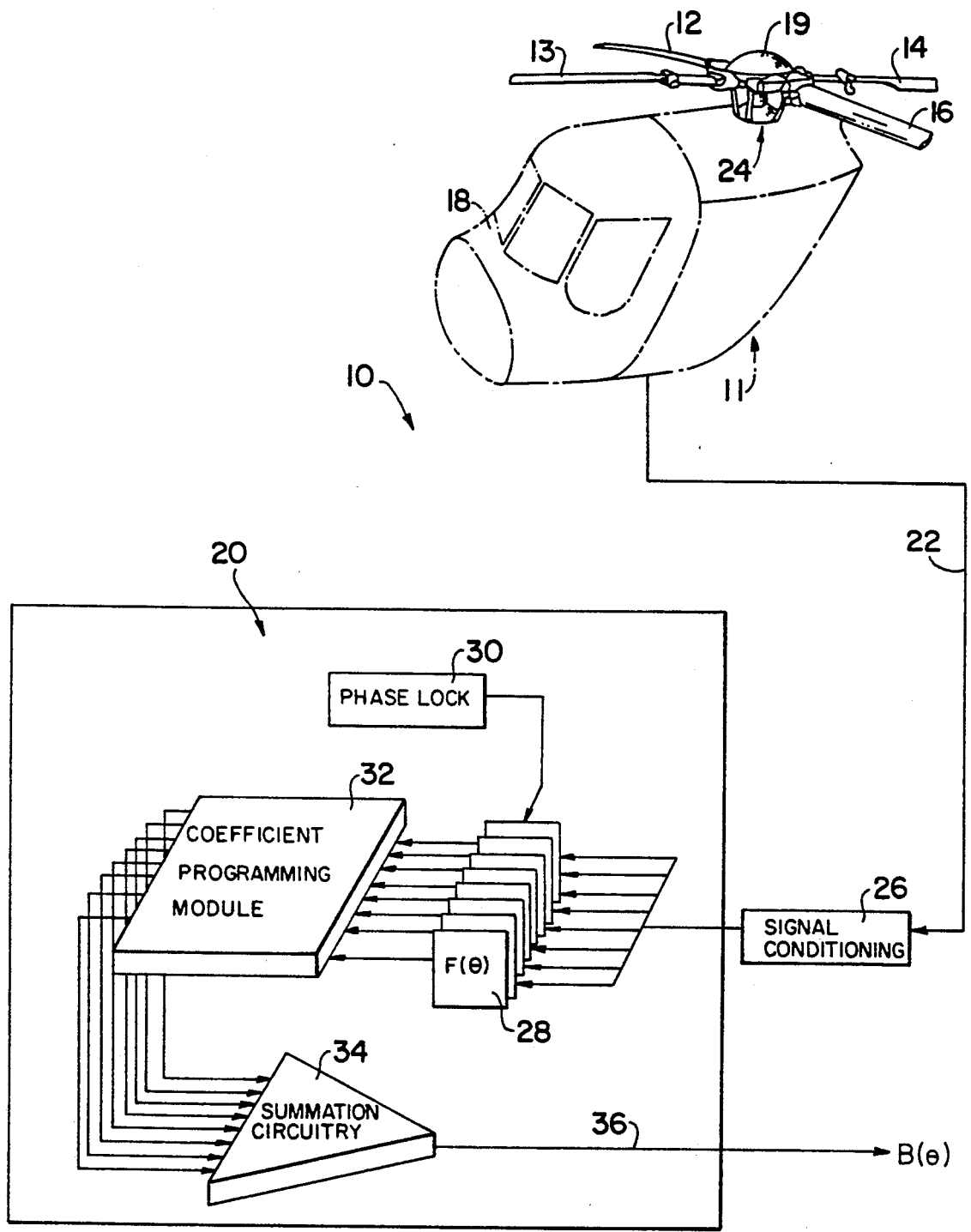
FIG. 1 is a simplified schematic diagram illustrating a portion of a load monitoring and recording system provided according to the present invention adapted for use with a helicopter.

Referring now to FIG. 1 there is illustrated a portion of a real time automatic load monitoring system 10 provided according to the present invention adapted for use on a helicopter 11. For the rotating mechanical systems of the helicopter, it is most often not physically possible or desirable to locally obtain parameter data, for example by positioning stress-strain gauges on a rotating helicopter blade to determine edgewise blade bending moments. The system of FIG. 1 determines a desired parameter (i.e. load) by means of indirect measurements taken remote from the rotating components. The process of determining physical parameters of a dynamic element from only a few localized operational measurements has been named "holometric" process, from the Greek "holos" (the whole) and "metricus" (to measure).

As an example, helicopter 11 shown in phantom has rotating blades 12, 13, 14 and 16 which are characterized by rotor blade bending strains or loads resulting from corresponding rotor blade bending moments. These moments are determined from strains measured on fuselage 18. Hub 19 experiences similar bending moments. Controller 20 receives a plurality of analog input data signals on lines 22 that extend from a corresponding plurality of monitor transducers indicated schematically at 24 located on the fuselage or the "fixed" system of the helicopter. It is advantageous for the transducers or sensors in the fixed system to be strain gauges or similar instruments. These transducers are placed preferably along load paths in the airframe (fuselage).

During flight, the helicopter motor blades experience strains or bending moments at various stations or positions which vary with the flight condition. Such flight conditions would include, for example, a high g-load in the pull out from a dive, lower than gravity g-load in a push over maneuver, hover, or high speed flight. In each flight condition or maneuver, the motions of the rotor blades differ from the motions in other flight conditions or maneuvers both in magnitude and phasing in a highly significant manner. Therefore, for each flight condition or maneuver, a relationship can be determined between the strains measured by the monitors (sensors) and the corresponding strain or bending moment in the rotor, hub or other rotating element of interest.

The linear relationship of the monitor signals of the fixed or fuselage system to those signals of strain in the rotating system can be found using the well established Moore-Penrose Generalized Inverse if, and only if, the monitor signal over flight conditions matrix of which the Moore-Penrose Generalized Inverse is to be taken is conditioned in terms of the informational reliability of the measured sensor signals. The process of determining this information matrix conditioning described hereinafter is critical and has been detailed in the above referenced U.S. Pat. No. 4,894,787.

In sum, an equation can be written to describe the relationship between the signals measured in the rotating system and those in the fixed system.

$$[R] = [K][C] + [E] \quad (1)$$

where R is a matrix of coefficients generated from the rotating signals, K is the matrix of coefficients derived from the fixed system signals, C is the relational matrix and E the matrix of errors or residuals. Equation 1 establishes that the matrices form a linear system that can mathematically be considered to reside in a linear vector space.

Both the K and C matrices are comprised of corresponding reduced matrices, $K_0$ and $C_0$ which mathematically span the vector space and which consist of J informationally independent columns of the matrix K and J rows of the matrix C. In other words, $K_0$ and $C_0$ are subsets of K and C such that there exists linear combinations of $K_0$, $C_0$ which can generate all the elements of R with a minimum Euclidian norm of error. Therefore, only the reduced matrices are needed to establish a correlation between R and K. Note also that it is only the identification of the informational content of the matrix $K_0$ that allows for a consistent analytical solution. The technique for arriving at these reduced matrices is referred to as the Jones Euclidian Limit Length Orthogonalization (JELLO) process and is detailed in the above referenced '787 patent.

As noted in the specification of the '787 patent, a set of constants exist which can be used to relate signals indicative of parameters, such as flatwise bending moment in the first member, to signals measured in the second member, i.e. vibration signals. These signals are constant regardless of the specific circumstance, i.e. flight condition of the helicopter or power level in an operating jet engine. The prior art assumed that this was not the case, that any such relational signal set, if it did exist at all, was time variant and simulation would require a multitude of microprocessor programs.

It is imperative that, for any relational signal set to be found, a substantially independent signal subset must first be established. The prior art assumes that there was sufficient information to adequately define the relationship between the signals measured in a first member and signals measured in a second member. Such a relationship can be established even if perfect or complete mathematical independence can not be found.

Certain aspects of the JELLO process may be understood with reference to the following example. In Table 1, there is illustrated a sequence of numbers which can, for example, correspond to the values of Fourier coefficients for a plurality of sensors positioned on the "fixed" system or a portion thereof. The sensors are positioned on tubes which position the helicopter hub with the main portion of the helicopter fuselage.

In Table 1, the elements in each column correspond to the coefficient from a given fixed system sensor while each row corresponds to a different flight condition (e.g. straight and level flying at 40 knots). In general, these coefficients can be considered to form an M by N matrix K with the matrix R as indicated below corresponding to the Fourier coefficients for the blade bending moment for a particular rotating helicopter blade at those given flight conditions.

TABLE 1

| [K] Fixed System Sensor #1 | Fixed System Sensor #2 | | Fixed System Sensor #M | |
|---|---|---|---|---|
| 1 | 1 | 2 | 3 | 3 | —— Flight Case #1 |
| 3 | 6 | 3 | 4 | 4 | —— Flight Case #2 |
| 6 | 4 | 3 | 3 | 3 | |
| 13 | 1 | 10 | 10 | 10 | |
| 16 | 13 | 21 | 15 | 15 | |
| 5 | 6 | 21 | 4 | 3.95 | —— Flight Case #N |

The value which actually comprises the matrix R can be first obtained from direct measurement:

$$R = 29 \; 8 \; 6 \; 10 \; 27 \; 20 \quad (2)$$

For computation of R from indirect measurements a matrix C is sought such that:

$$[K]\{C\} = \{R\} + \{\text{error}\}; \quad (3)$$

with a minimum value for:

$$\{\text{error}\}^T\{\text{error}\}$$

In general, there exists no C such that the {error} matrix is zero. The matrix C is computed, for a non-square matrix by use of the known pseudo inverse computation technique $$\{C\} = [[K]^T[K]]^{-1}[K]^T[\{R\} + \{\text{error}\}] \quad (4)$$

which yields the following matrix:

$$\{C\} = -3.7 \; 0.22 \; -1.7 \; 820 \; -812 \quad (5)$$

then:

$$[K]\{C\} = \{R\} + \{\text{error}\} = 17 \; 17 \; -2.9 \; 14 \; 26 \; 20 \quad (6)$$

Note that a comparison of the values in equation 2 and 6 while not exact, represents a good fit; in other words it constitutes the computed value with minimum RMS error.

It is mandatory that the stability or "robustness" of the relationship be checked by assuming some random error (10%) in each measurement made in the fixed system. Errors of this type and at least this magnitude must be considered as it is representative of real measurement error and flight conditions. The matrix $[K_E]$ is comprised of the elements of [K] having 10% random error and is:

| 1.02 | 0.905 | 2.17 | 2.95 | 3.01 | |
|------|-------|------|------|------|------|
| 2.9  | 6.07  | 2.97 | 4.21 | 3.01 | |
| 6.34 | 3.66  | 3.16 | 2.8  | 3.22 | $[K_E]$ |
| 12.1 | 1     | 9.81 | 10.7 | 9.65 | |
| 16.1 | 12.8  | 22.9 | 14.7 | 15.6 | |
| 4.71 | 6.1   | 20.9 | 4.28 | 3.65 | |

New matrix $K_E$ is multiplied by the rational matrix; C yielding:

$$[K_E]\{C\} = \{R_E\} = -33\ 192\ -350\ 850\ -710\ 490 \quad (7)$$

Table 2 shows a comparison of the magnitudes of elements of these different [R] matrices.

TABLE 2

| {R} Actual | {R} Best Fit | {R_E} Assuming 10% Random Input Error |
|-----------|-------------|---------------------------------------|
| 29        | 17          | −33                                   |
| 8         | 17          | 192                                   |
| 6         | −2.9        | −350                                  |
| 10        | 14          | 850                                   |
| 27        | 26          | −710                                  |
| 20        | 20          | 490                                   |

Table 2 compares the computed flatwise edge bending moment coefficients as found according to the three methods. Comparison between the [R] best fit and [R_E] coefficients shows a massive difference in the values of the elements in the matrix [R] which have only a slight error introduced. The magnitude of this error is clearly indicative that the simple solution by using the pseudo inverse technique provides a very unstable solution. The relationship is said to lack "robustness".

This lack of "robustness" has characterized all attempts to indirectly measure a parameter such as blade bending moments in a helicopter blade and prevented any use of indirect or remote sensing. However, a reduced matrix can be found with the JELLO technique of the '787 patent which is comprised of elements which are substantially independent. In the present example, the threshold "angle of independence" is selected to be 2.85 degree.

A calculation of the reduced matrix $[K_0]$ is made in the manner detailed in the present specification, referred to as the "JELLO" process yields:

$$[K_0] = \text{Jello } [K] \quad \begin{array}{cccc} 1 & 1 & 2 & 3 \\ 3 & 6 & 3 & 4 \\ 6 & 4 & 3 & 3 \\ 13 & 1 & 10 & 10 \\ 16 & 13 & 21 & 15 \\ 5 & 6 & 21 & 4 \end{array} \quad (8)$$

Note that the last column of [K] has not been kept, it is comprised of elements which are very similar to the fourth column thereof, and is not "independent" enough to pass the 2.85 degree threshold. The matrix $[K_{0E}]$ is comprised of elements having 10% random error and is:

$$[K_{oE}] = \begin{array}{cccc} 1.02 & 0.905 & 2.17 & 2.95 \\ 2.9 & 6.07 & 2.97 & 4.21 \\ 6.34 & 3.66 & 3.16 & 2.8 \\ 12.1 & 1 & 9.81 & 10.7 \\ 16.1 & 12.8 & 22.9 & 14.7 \\ 4.71 & 6.1 & 20.9 & 4.28 \end{array} \quad (9)$$

A computation of the reduced relational matrix $[C_0]$ is provided in accordance with the pseudo inverse technique and is as follows:

$$\{C_0\} = [[K_0]^\%[K_0]]^{-1}[K_0]^5[\{R_0 + \text{error}\}] = -3.8\ -0.27\ 0.82\ 5.2 \quad (10)$$

and $$[K_0]\{C_0\} = [\{R_0 + \text{error}\}] = 13\ 10\ -0.56\ 11\ 32\ 18 \quad (11)$$

To determine whether or not the present invention has increased ability or helped 37 robustness" we can use the reduced matrix to calculate the coefficients as follows:

$$[K_{0E}]\{C_0\} = \{R_{0E}\} = 13\ 12\ -7.7\ 18\ 31\ 20 \quad (12).$$

A comparison between coefficients calculated using the reduced matrix and with a straightforward pseudo inverse method yields.

TABLE 3

| {R}  | {R} Best Fit | {R_E} 10% Random |
|------|--------------|-------------------|
| 29   | 17           | −33               |
| 8    | 17           | 192               |
| 6    | −29          | −350              |
| 10   | 14           | 850               |
| 27   | 26           | 710               |
| 20   | 20           | 490               |

However, with the JELLO process:

TABLE 4

| {R_0} Best Fit | {R_{0E}} |
|----------------|----------|
| 13             | 13       |
| 10             | 12       |
| −5.6           | −7.7     |
| 11             | 18       |
| 32             | 31       |
| 18             | 20       |

The above computation clearly demonstrates that the wild output signal changes which are produced as a result of small (approximately 10%) changes in the input signal can be removed and ultimately enables remotely sensed data to be used at all. It is clear from the above example the system disclosed in the prior art, such as the '678 system, are of no use in remote sensing as they (1) use a maximum amplitude of the entire sensor signal or (2) involve simple frequency domain analysis of the sensor signals. Those skilled in the art will note that the elimination of redundant, mathematically dependent signals is necessary since these signals are inherently destabilizing. In addition, a strict mathematical definition of "independence" can be relaxed and still yield a workable device.

The above example demonstrates the utilizing of the JELLO process for use in remote sensing systems, such as the '787 system, that generate the constant coefficients for the reduced matrices $C_0$, $K_0$ by means of decomposition by Fourier or other analysis of the time dependent signals. As a result, the time dependent signal indicative of the desired remote parameter must be generated using waveform synthesizers and the like, preventing generation of the desired remote parameter signal in a frequency domain removed rom "processor" limitations entirely in real time.

The present inventor, however, was first to note that the JELLO process can be used in a remote sensing system without the signal decomposition-regeneration process disclosed in the '787 patent. This marks an important first point of departure of the present invention over the prior art.

In general, a time varying periodic signal q(t) can be sampled over each period and expressed as a matrix of terms:

$$q(t) = \begin{vmatrix} q(t_1) & q(t_2) & q(t_3) \\ q(t_1 + t_j) & q(t_2 + t_j) & q(t_3 + t_j) \\ q(t_1 + 2t_j) & q(t_2 + 2t_j) & q(t_3 + 2t_j) \end{vmatrix} \quad (13)$$

where the number of columns (J) correspond to the number of samples in a period $t_j$, and the number of rows (M) correspond to the number of periods sampled. For the system 10 of FIG. 1, the period would correspond to the duration of one helicopter blade revolution. Since the signals are periodic, each sample corresponds to a particular phase in a single period. For example, the first data sample in a signal sampled 10 times per period would be at a phase equal to 36 degrees, the second sample would be at a phase equal to 72 degrees, and so forth.

Given the present system 10, there are 8 sensors (I sensors, in general) on the fuselage (fixed system), and therefore there are 8 measured signals $q_1(t)$ to $q_8(t)$, each sampled "j" times in "m" blade revolutions. These signals can be reexpressed as:

$$T_j = q_i(8_j) = \begin{vmatrix} q_1(t_j) & q_2(t_j) \ldots q_7(t_j) \, q_8(t_j) \\ q_1(t_j + t_j) & q_2(t_j + t_j) \ldots q_8(t_j + t_j) \\ q_1(t_j + 2t_j) & \ldots \end{vmatrix} \quad (14)$$

referred to as signal phase matrices. There is one matrix, T, for each of the sample phases $T_1$ to $T_j$. The matrix T for the preferred embodiment with 8 sensors is:

$$T = \begin{vmatrix} [T_{11}] & [T_{12}] & \ldots & [T_{10}] \\ [T_{21}] & \ldots & & \ldots \\ \ldots & & & [T_{j8}] \end{vmatrix} \quad (15)$$

Each of the signal phase matrices represent the signal values of the sensors for the "J" constant phase locations measured in fundamental signal periods. For each phase, j, the following equation are solved for the "I" phase signal coefficients, $c_j$, $$[T_j]|C_j|_{=q_1(s_j)} = |B| \quad (16).$$

The matrix T is reduced to its maximally independent form $$[T_O]_j \quad (17).$$

by means of the JELLO process detailed above and solved, at each j, for $$|C_j|_O = (T^T{}_O T_O)^{-1}(T^T{}_O)|B| \quad (18)$$

yeilding $C_0$, the time invariant coefficient matrix over M fundamental periods. This relationship can be expressed in another form:

$$Q_1(T_j, t_j + t_j, t_j + 2t_j, \ldots) = [T_O](t_j, t_j + t_j, t_j + 2t_j, \ldots)|C_j| \quad (19)$$

or equivalent:

$$\begin{bmatrix} q_1(t_j) \\ q_1(t_{j+1}) \\ \cdot \\ \cdot \\ \cdot \\ q_1(t_j) \\ q_1(t_{j+J}) \\ q_1(t_{j+J+1}) \\ = \\ \cdot \\ \cdot \\ \cdot \\ q_1(t_{2J}) \\ \cdot \\ \cdot \end{bmatrix} \quad (20)$$

$$\begin{bmatrix} (T_O)_j & 0 & \ldots & 0 & 0 \\ 0 & (T_O)_{j+1} & \ldots & & \cdot \\ \cdot & & & & \cdot \\ \cdot & & & \ldots & 0 \\ 0 & 0 & \ldots & 0 & (T_O)_J \\ (T_O)_{j+J} & 0 & \ldots & 0 & 0 \\ 0 & (T_O)_{j+J+1} & & & \cdot \\ \cdot & & & & \cdot \\ \cdot & & & \ldots & 0 \\ 0 & 0 & \ldots & 0 & (T_O)_{2J} \\ \ldots & & \ldots & & \ldots \end{bmatrix}$$

$$\begin{bmatrix} |c_O|_j & 0 & & \ldots & 0 \\ 0 & |c_O|_{j+1} & & & \cdot \\ \cdot & & & & \cdot \\ \cdot & & & \ldots & 0 \\ 0 & 0 & & \ldots & 0 & |c_O|_J \end{bmatrix}$$

The complete matrix, C, is then computed and can be used by system 10 in operation. Note again that the above equations establish a relationship for a particular set of flight conditions. Equivalent equations may be established for other larger sets of flight conditions up to the entire flight envelope for the system of FIG. 1 or the mathematical equivalent of flight conditions when the present invention is adapted for use with other applications.

Referring again to FIG. 1, the sensor signals are provided to the controller 20 on line 22 after passing through signal conditioning circuitry 26. The sensor signals are sampled by signal sampling apparatus 28 a select number of times per revolution, typically several hundred or thousand. However, for purposes of illustrative clarity, only 1 phase and 8 load paths is shown. Phase locking circuitry 30 generates a signal once per blade revolution and provides that signal to apparatus 28 to ensure that the sampled signals have the exact respective phases in each revolution.

The system 10 also comprises a coefficient programing module 32 which contains all of the signal coefficients generated by the above referenced calibration process. The module 32 receives the sensor signals by phase and multiples these signals by signals corresponding to the correlation coefficients. The product thereof is provided to a summing mechanism 34 which outputs on line 36 the desired time and phase dependent parameter signal $B(\theta)$, such as flatwise blade bending or hub bending moments.

Figure 2:
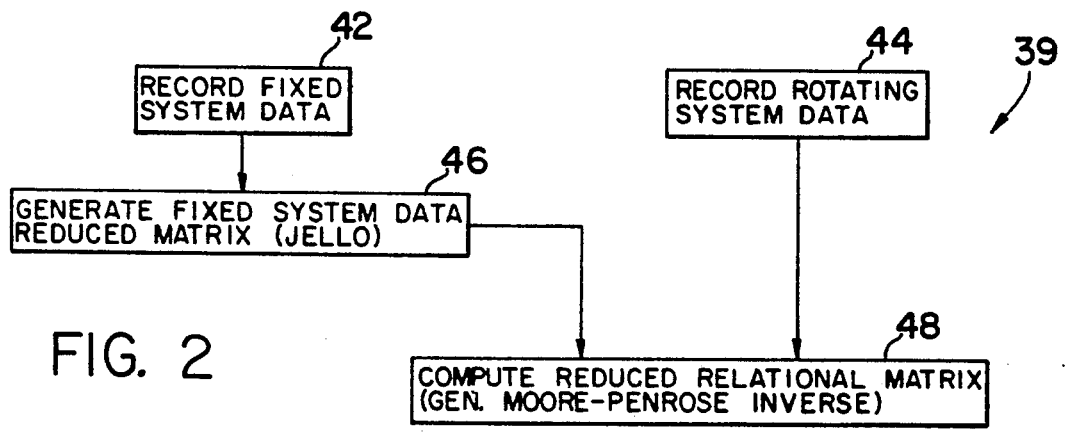
FIG. 2 is a diagrammatic illustration of an algorithm executed by the system of FIG. 1 during system calibration.

A calibration algorithm 40 executed by the present invention in generating the coefficient signals is shown in FIG. 2. Initially data is recorded by sensors in both the rotating helicopter blade and the fixed fuselage (blocks 42,44). The fixed system reduced signal matrix is computed using the JELLO process (block 46). The reduced fixed system signal matrix, $K_0$, is used to compute the reduced relational matrix, $C_0$, at block 48.

Figure 3:
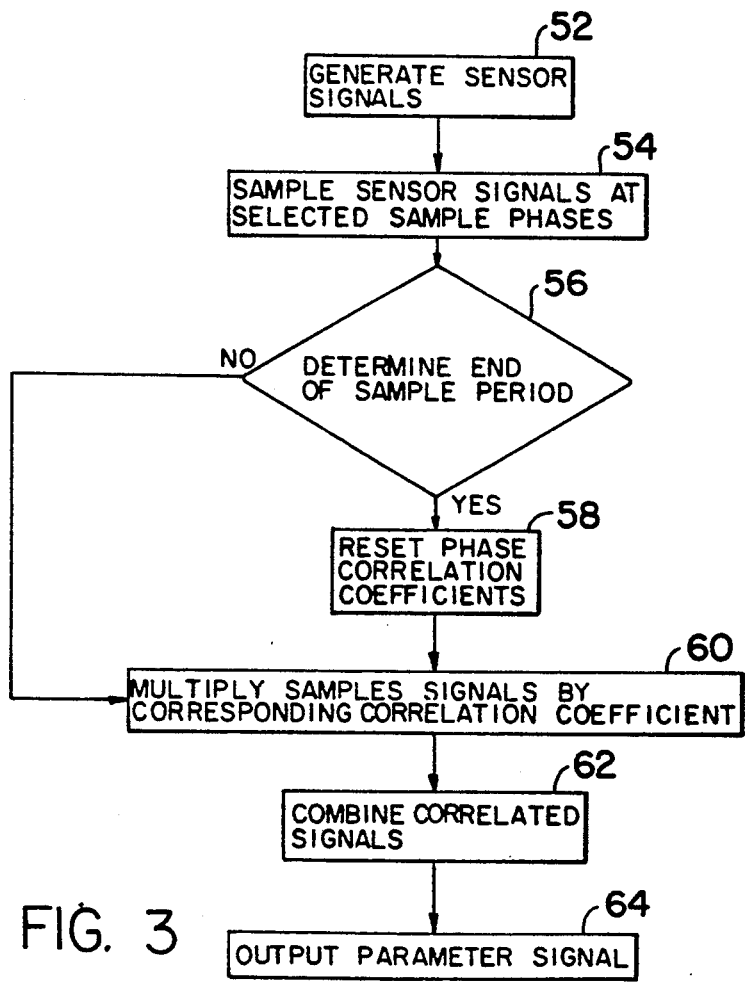
FIG. 3 is a simplified diagrammatic illustration of an algorithm executed by the system of FIG. 1 during operation.

FIG. 3 diagrammatically shows the operation of the system 10 of FIG. 1. At block 52 the sensors in the fixed system provide signals to the controller. These signals are sampled at select number of times at preselected phases (block 54) each blade revolution (block 56). At block 58 the system resets the phase correlation coefficients. Signals at each phase are multiplied by the corresponding phase correlation coefficient (block 60). The correlated signals are combined (block 62) and a time dependent output parameter signal is provided at (block 64).

Figure 4:
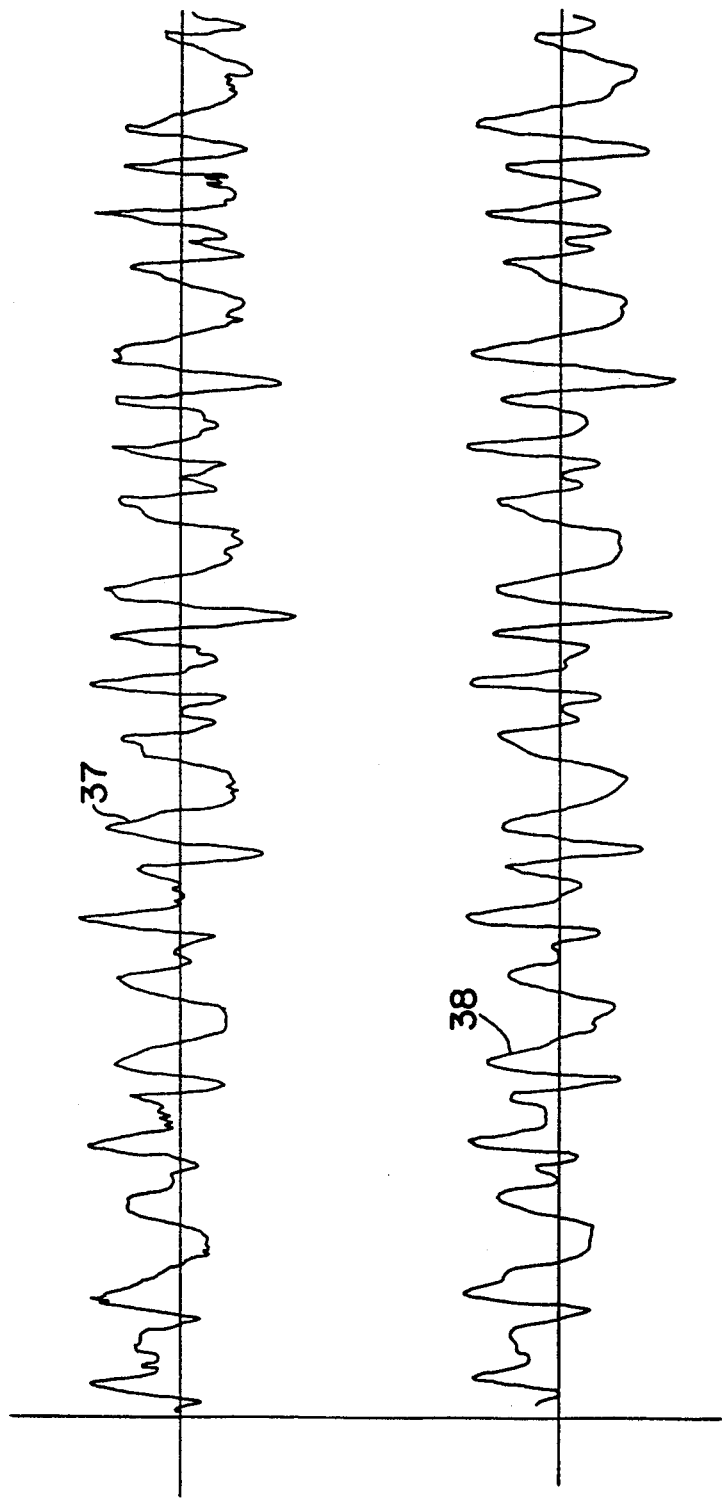
FIG. 4 illustrates measured flatwise blade bending moments on a helicopter blade as compared to blade bending moments computed by the system of FIG. 1.
Figure 5:
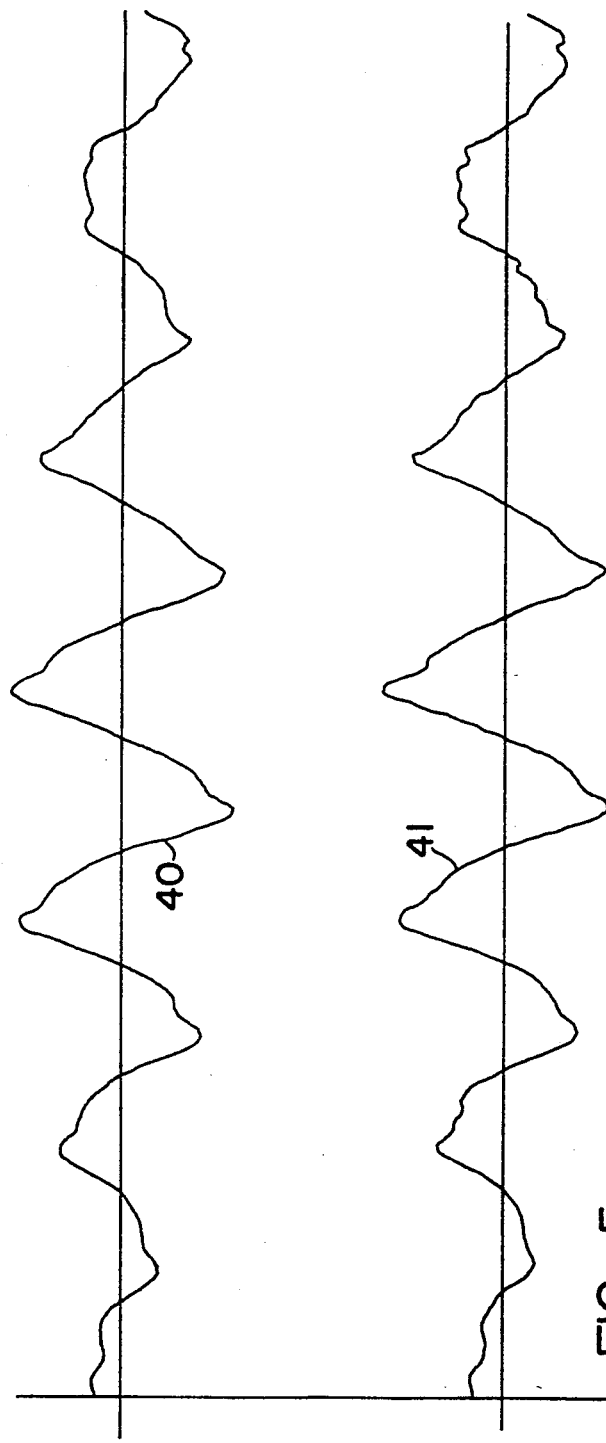
FIG. 5 illustrates measured hub bending moments as compared to hub bending moments computed by the system of FIG. 1.

FIG. 4 illustrates the results obtained by the system of FIG. 1 applied to flight data taken during an approximately 2 g maneuver by a helicopter. Curve 37 corresponds to flatwise blade bending moment as measured directly by sensors on the helicopter blade while curve 38 corresponds to the same parameter as measured by the system 10. Both curves are comprised of data gathered over 6 blade revolutions with 600 data points (one sample per 3.6°). FIG. 5 illustrates the results for hub bending moment obtained by the system of FIG. 1 from the same flight data. Curve 40 corresponds to hub bending moment as measured directly by sensors on the helicopter hub, while curve 41 corresponds to the same parameter as measured by the system 10.

Similarly, although the invention has been shown and described with respect to a preferred embodiment thereof, it should be understood by those skilled in the art that various other changes, omissions and additions thereto may be made therein without departing from the spirit and scope of the present invention.

I claim:

1. A method of generating, from a first set of periodic electrical signals measured in a first member indicative of a first member physical characteristic, a relational set of electrical signals equating with said first signal set a second set of periodic electrical signals indicative of said physical characteristic as measured in a cooperative second member that physically communicates with said first member, said method comprising the steps of:

measuring at time intervals corresponding to preselected phases during each of a plurality of said signal periods at first electrical signal set indicative of a first member physical characteristic by means of sensors directly communicating with the first member;

measuring at said preselected time intervals during each of said plurality of signal periods a second electrical signal set by means of sensor directly communicating with the second member, said second member measured signal set, including signals indicative of said first member physical characteristic;

configuring a plurality of first member electrical signal subsets from said first member electrical signal set such that each contains the signals at respective ones of said time intervals;

configuring a plurality of second member signal subsets from said second member electrical signal set such that each contains the signals at respective ones of said time intervals;

said first and second member electrical signal subsets corresponding to respective first and second mathematical vectors lying in a vector space with each of said first and second member electrical signal subsets mathematically configured into respective first and second matrices, computing, from said second member signal subsets, a substantially independent electrical signal subset having as elements a plurality of electrical signals corresponding to elements that substantially span said mathematical vector space; and generating a spanning relational electrical signal set corresponding to a mathematical pseudo inverse of said first member electrical signal set with said substantially independent electrical signal subset.

2. The method of claim 1 further comprising the steps of generating from said relational electrical signal set and said first and second member electrical signal sets a complete electrical relational signal set.

3. The method of claim 1 wherein the first member rotates relative to the second member.

4. The method of claim 1 wherein said first member electrical signal set further comprises a plurality of signal subset indicative of said first member physical characteristic for a corresponding plurality of flight conditions and wherein said relational and second member electrical signal sets further comprise signal subsets of corresponding flight conditions.

5. The method of claim 1 wherein said computing step includes computation steps in accordance with a Jones Euclidian Limit Length Orthogonalization Algorithm that, for each second member electrical signal subset, includes the steps of:

assuming a first column of said elements of said second member electrical signal set to be mathematically independently and comprise said independent electrical signal subset, comparing each element in successive columns of said second member electrical signal set with said mathematically independent signal column, and supplementing said second member independent electrical signal subset with elements of said successive columns which are determined to be substantially mathematically independent from said independent electrical signal subset.

6. The method of claim 5 wherein said computing step further comprises the steps of comparing each of said second member signal subset elements against a pre-selected threshold value indicative of substantial mathematical independence and including said element in said substantially independent second member signal subset only if said threshold value is at least as great as said element.

7. The method of claim 5 wherein said comparing step further comprises the steps of computing an electrical signal value corresponding to a mathematical dot product of said second member signal subset element and said substantially independent signal subset.

8. An apparatus for generating, from a first set of periodic signals measured tin a first member indicative of a first member physical characteristic, a relational set of signals equating with said first signal set a second set of periodic signals indicative of said physical characteristic as measured in a cooperative second member that physically communicates with said first member, said apparatus comprising:
- a first means for measuring at time intervals corresponding to preselected phases during each of a plurality of said signal periods a first electrical signal set indicative of a first member physical characteristic by means of sensors directly communicating with the first member;
- a second means for measuring at said preselected time intervals during each of said plurality of signal periods a second electrical signal set by means of sensors directly communicating with the second member, said second member measured signal set including signals indicative of said physical characteristic;
- a means for configuring a plurality of first member electrical signal subsets from said first member electrical signal set such that each contains the signals at respective ones of said time intervals;
- a means for configuring a plurality of second member signal subsets from said second member signal set such that each contains the signals at respective ones of said time interval;
- said first and second member electrical signal subsets corresponding to respective first and second mathematical vectors lying in a vector space with each of said first and second member electrical signal subsets mathematically configured into respective first and second matrices,
- a means for computing, from said second member electrical signal subsets, a substantially independent electrical signal subset having as elements a plurality of electrical signals corresponding to elements that substantially span said mathematical vector space; and
- a means for generating a spanning relational electrical signal set corresponding to a mathematical pseudo inverse of said fist member electrical signal set with said substantially independent electrical signal subset.

9. The apparatus of claim 8 wherein the first member rotates relative to the second member.

10. The apparatus of claim 8 wherein the first member vibrates relative to the second member.

11. The apparatus of claim 9 wherein said first member electrical signal set further comprises a plurality of electrical signal subset indicative of said first member physical characteristic for a corresponding plurality of flight conditions and wherein said relational and second member electrical signal sets further comprise electrical signal subsets of corresponding flight conditions.

12. The apparatus of claim 8 wherein said controller further comprises a comparator for comparing each value of second member electrical signal subset elements against a pre-selected threshold value indicative of substantial mathematical independence and including said element in said substantially independent signal subset only if said threshold value is at least as great as said element.

13. The apparatus of claim 8 wherein the computation means determines the independent signal subset in accordance with a Jones Euclidian Limit Length Orthogonalization Algorithm and includes;
- a means for assuming a first column of said elements of said second member signal subset to be mathematically independent and comprise said independent electrical signal subset;
- a means for comparing each element in successive columns of said second member signal subset with said mathematically independent signal column; and
- a means for supplementing said independent signal subset with elements of said successive columns which are determined to be substantially mathematically independent from said independent electrical signal subset.

14. The apparatus of claim 8 further comprising a control signal circuit receiving said periodic signals for generating a control signal indicative of the beginning of a next one of said periods; and
a means for phase synchronization of the sampling of said first and second measuring means.

15. The method of claim 1 further comprising the steps of generating a control signal indicative of the beginning of a next one of said periods; and
phase synchronizing the sampling of said first and second measuring means.

16. The apparatus of claim 14 wherein said means of phase synchronization means includes a means for providing a signal indicative of helicopter rotor rotation.

17. A system for determining a time dependent electrical signal corresponding to a physical characteristic in a first member, said system comprising:
- a means for measuring, in a cooperative second member physically communicating with said first member, a time dependent periodic electrical signal set at time intervals corresponding to preselected phases during each of a plurality of signal periods, said second member measured electrical signal set including signals indicative of said first member physical characteristic;
- a means for configuring a plurality of second member electrical signal subsets from said second member signal set such that each contains the measured signals at respective ones of said time intervals;
- a means for generating an electrical signal set indicative of said first member physical characteristic that combines said second member electrical signal subsets with electrical signals corresponding to predetermined correlation coefficients generated by computing a mathematical pseudo inverse of a signal set corresponding to coefficients of first member physical characteristic signals directly measured in said first member with an electrical signal set corresponding to a substantially independent subset of electrical signals indicative of said first member physical characteristic directly measured in said second member, said first and second member coefficient electrical signal sets corresponding to respective first and second mathematical vectors lying in a vector space with each of said signal sets corresponding mathematically to respective first and second matrices comprised of elements corresponding to respective ones of said electrical signals arranged in rows and columns; and a means for generating from said measured periodic signal and said computed first member physical characteristic signal set a time dependent signal indicative of said first member physical characteristic.

18. A method for use in determining values of a physical parameter of a first member comprising the steps of:

measuring a time dependent periodic electrical signal set in a cooperative second member physically communicating with said first member including signals indicative of said first member parameter;

measuring, in said second member a time dependent periodic electrical signal set at time intervals corresponding to preselected phases thereof during each of a plurality of signal periods, said second member measured signal set including signals indicative of said first member parameter;

configuring a plurality of second member signal subsets from said second member signal set such that each contains the measured signals at respective ones of said time intervals;

generating an electrical signal set indicative of said first member parameter by combining said second member electrical signal subsets with electrical signals corresponding to predetermined correlation coefficients generated by computing a mathematical pseudo-inverse of a signal set corresponding to coefficients of first member parameter signals directly measured in said first member with a signal set corresponding to a substantially independent subset of signals indicative of said first member parameter directly measured in said second member, said first and second member coefficient signal sets corresponding to respective first and second mathematical vectors lying in a vector space with each of said signal sets mathematically configured into respective first and second matrices comprised of elements corresponding to signals thereof arranged in rows and columns; and generating from said measured periodic signal and said computed first member parameter signal set a time dependent signal indicative of said first member parameter.

19. The system of claim 17 further comprising:

a control circuit receiving said periodic signals for generating a control signal indicative of the beginning of a next one of said periods; and a means for phase synchronization of the sampling of said first and second measuring means.

20. The method of claim 18 further comprising the steps of generating a control signal indicative of the beginning of a next one of said periods; and phase synchronizing the sampling of said first and second measuring means.

21. The system of claim 17 wherein said correlation means further comprises apparatus for determining said correlation coefficients, including:

means for measuring a signal set indicative of the first member physical characteristic;

means for measuring a signal set in the second member, including those signals indicative of a corresponding determinative physical characteristic;

means for computing from said first measured signal set a mathematically independent signal subset thereof;

means for generating, from said independent signal subset, signals correlating said first member parameter signal and said corresponding parameter signal sets.

* * * * *